United States Patent [19]

Carlin

[11] 4,117,860
[45] Oct. 3, 1978

[54] PRESSURE DIFFERENTIAL FLOW RETARDANT VALVE

[76] Inventor: Jack M. Carlin, R.F.D. Box 135, Del Mar, Calif. 92014

[21] Appl. No.: 784,962

[22] Filed: Apr. 8, 1977

[51] Int. Cl.² ............................................. F16K 15/03
[52] U.S. Cl. .................................. 137/513.5; 137/521; 137/624.27
[58] Field of Search ............... 137/517, 521, 522, 523, 137/513.5, 606, 624.27, 460; 251/303

[56] References Cited

U.S. PATENT DOCUMENTS

| 572,464 | 12/1896 | Woods | 137/513.5 X |
|---|---|---|---|
| 810,746 | 1/1906 | Hadley et al. | 137/521 |
| 827,827 | 8/1906 | Starr | 137/513.5 |
| 876,066 | 1/1908 | Klever | 137/521 |
| 1,193,958 | 8/1916 | Youngs | 137/606 |
| 2,846,181 | 8/1958 | Orelind et al. | 251/303 X |
| 3,244,194 | 4/1966 | Henry | 137/460 |
| 3,293,389 | 12/1966 | Bhicknapahari | 137/521 X |

*Primary Examiner*—William R. Cline
*Attorney, Agent, or Firm*—Ralph S. Branscomb

[57] ABSTRACT

The invention is a flow delay valve to be used in conjunction with fire fighting and attaches to the fire hydrant so that as the fire truck proceeds to unroll hose on the way to the fire site the hose is filled slowly due to the action of the delay valve, permitting the fire truck to proceed unhindered by full hose pressure but without requiring the stationing of a fireman at the hydrant to turn the hydrant on after the fire truck has arrived at the site as the valve fully opens automatically upon the hose becoming filled to permit unobstructed water flow.

9 Claims, 9 Drawing Figures

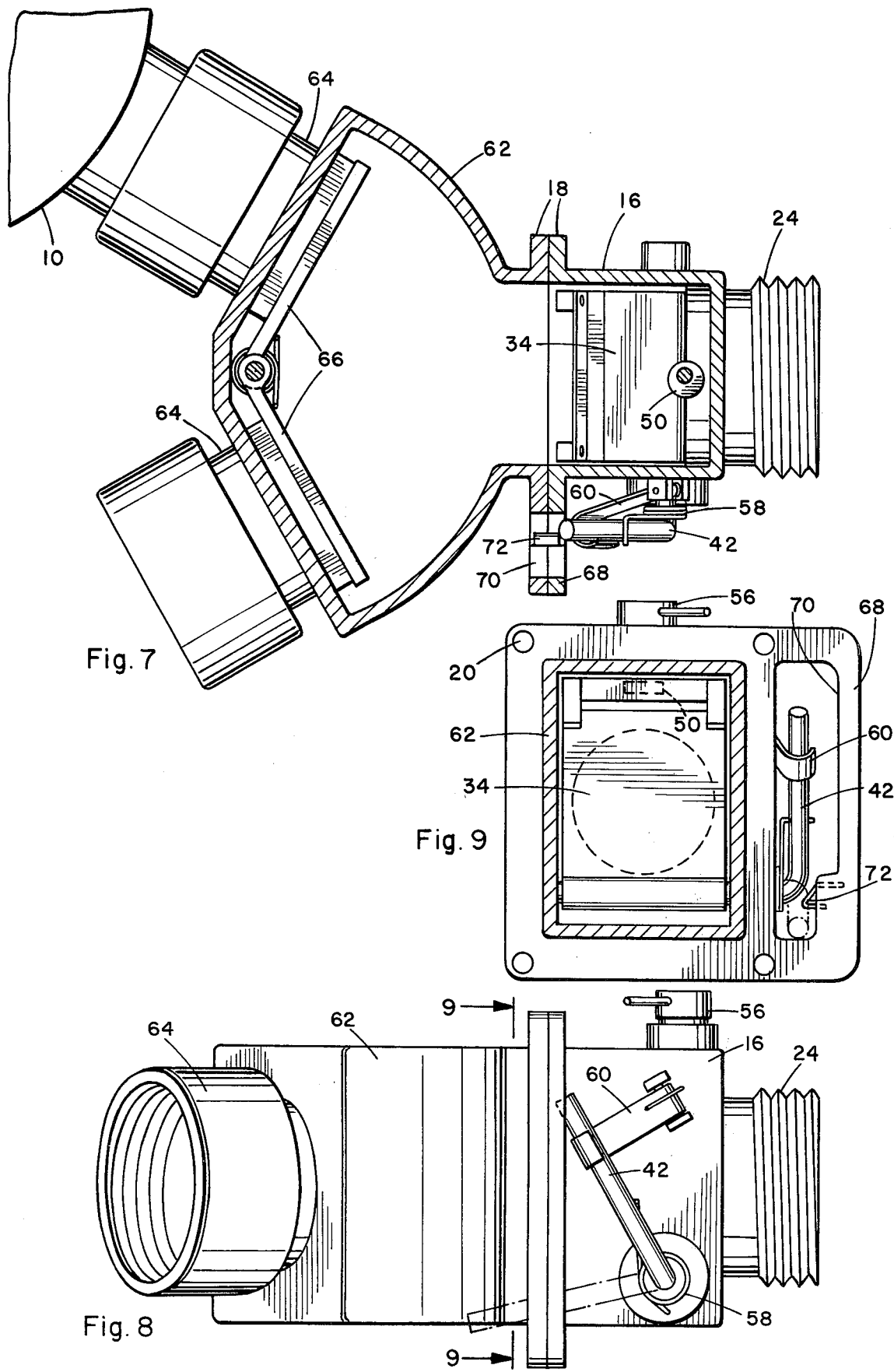

PRESSURE DIFFERENTIAL FLOW RETARDANT VALVE

BACKGROUND OF THE INVENTION

The invention pertains to fire fighting and particularly to a means for permitting a fire hose to lie slack while the fire truck unrolls the hose on the way to the site, and then permits the hydrant to deliver full pressure to the hose subsequent to arrival of the truck without requiring a fireman to remain at the hydrant to open the hydrant valve.

Applicant has also filed two other applications, Ser. Nos. 636,556 now U.S. Pat. No. 4,022,421 and 722,709 for devices which are variously installed in the fire hose or at the fire hydrant. One of these devices is a valve controlled either by a conventional timer or radio control unit to open the valve subsequent to the attachment of the valve with hose to the hydrant. The other of these inventions pertains to a unique erodable element disposed in a special housing in the hose coupling and which is destroyed by the water after a period of time to permit full flow, the remains of the destroyed disc being being blown out the end of the hose.

A pressure regulator valve operating on a principle similar to applicant's valve is shown in U.S. Pat. No. 1,097,879. This valve would not work in the present application, not only because of its delicacy, but also because it lacks the two distinct modes of operation necessary in the instant valve.

The radio or timer controlled model described above represents the most sophistocated of the line but is not only quite expensive, but is rather complicated and thus subject to a certain amount of unavoidable human error and malfunction. This unit would also be inappropriate for small fire companies operating on a limited budget. The errodable disc was developed for these small companies, and as the disc requires replacing after every use but the adaptor coupling is simple, it is ideal for small fire companies which do not have many fires because of the minimal expense involved. However applicant felt there is a need for an intermediate device which although being more sophistocated than the errodable disc, is simpler, less expensive and most of all less subject to occasional human error than is the more complicated radio controlled model.

SUMMARY OF THE INVENTION

The delay valve of the present invention fulfills the above-mentioned need and operates automatically, once set into action, by the pressure drop across the valve chamber. In other words, when the hose is initially connected to the hydrant via the instant valve, the hydrant pressure is great compared to the absent pressure in the evacuated hose, and this pressure differential forces a hinge gate across the valve outlet. This gate is prevented from completely closing by means of a variable cam so that despite the pressure differential a slight flow is permitted so that the hose will, over a period of time, fill. Once the hose is filled, the pressure differential no longer exists and built-in spring bias snaps the gate open to permit free flow of water through the valve when the water is needed at the nozzle.

BRIEF DESCRIPTION OF THE DRAWINGS

FIG. 7 is a sectional view similar to FIG. 4, but showing an alternative dual inlet configuration;

FIG. 8 is a side elevation view of the structure of FIG. 7; and

FIG. 9 is a sectional view taken on line 9—9 of FIG. 8.

DETAILED DESCRIPTION OF THE PREFERRED EMBODIMENT

Figure 1:
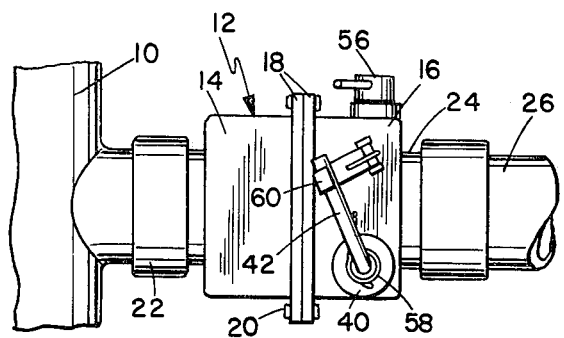
FIG. 1 is a side elevation view of the valve unit attached to a fire hydrant.

A portion of a fire hydrant is shown at 10. The valve of the present invention has an outer casing 12 comprised of two mating plenums or half-chambers 14 and 16. The casing is made in two halves for convenience only and these two halves are permanently joined together at flanges 18 by bolts or rivets 20. The first half 14 of the casing is coupled to the nipple of the fire hydrant by means of a conventional gland 22 and the other half of the casing carries a typical threaded male coupling 24 identical to that of the fire hydrant for the connection of the fire hose 26.

Figure 3:
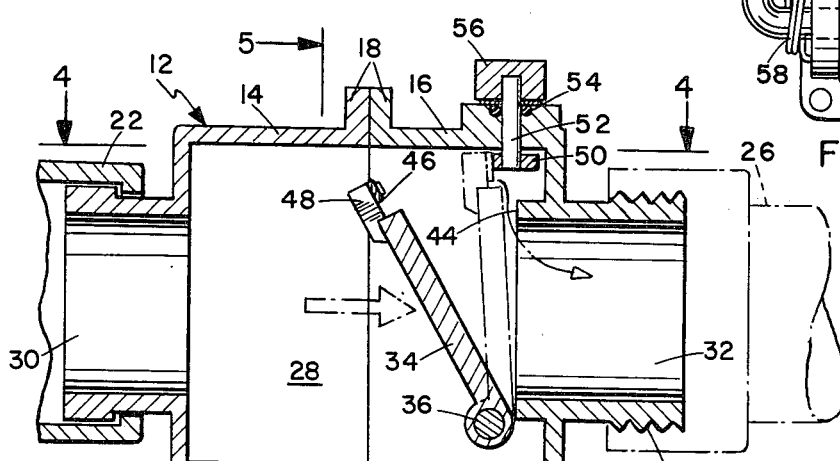
FIG. 3 is a sectional view taken on line 3—3 of FIG. 2.
Figure 6:
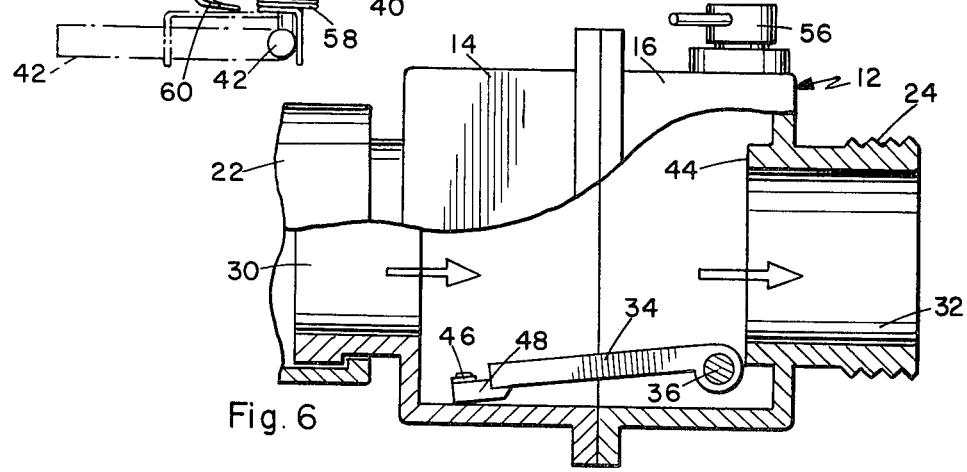
FIG. 6 is a side elevation view, partially cut away to show the valve element in full open position.

In obvious fashion water would enter the internal chamber 28 defined by the casing through the inlet 30 and exit the chamber through the outlet 32 defined by the interior lip of the nipple 24 as is best seen in FIGS. 3 and 6.

To interfere with the flow of water through the chamber 28 a gate 34 is provided which is mounted on a shaft 36 which is in turn journalled in the casing wall. One end of this shaft terminates in a bearing cup 38 and the other end extends through the side wall of the casing and a reinforcing bushing 40, the end being orthogonally bent to define a reset lever 42 as can best be seen from FIG. 2.

Viewing FIG. 3, the gate 34 would fall substantially flush against the inner rim 44 which defines the valve outlet 32 but is prevented from doing so by the following structure.

Figure 5:
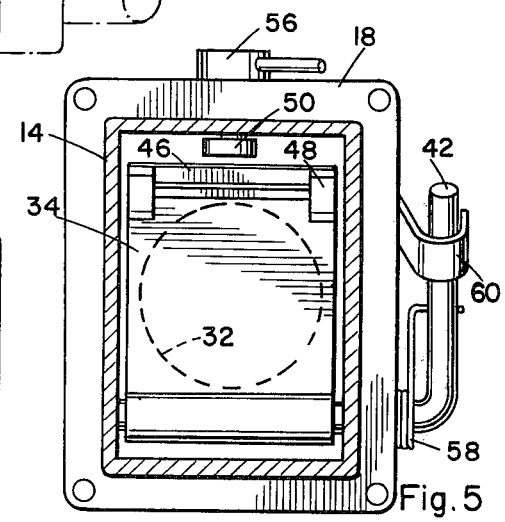
FIG. 5 is a sectional view taken on line 5—5 of FIG. 3.

A length of leaf spring 46 is carried by a pair of support arms 48 in spaced relation from the free end of the gate as is best seen in FIGS. 3 and 5. This spring conflicts with a spacer element, preventing the gate from completely closing, the spacer element in the preferred embodiment taking the form of eccentric cam 50. This cam mounts on the end of a short shaft 52 projecting through and externally of the casing wall, sealed by an O-ring 54 and terminating in a lever-bearing control knob 56. This knob can be used to rotatively adjust the angular disposition of the cam, and thus vary the spacing of the gate from the outlet 32 when the gate is in its most closed position. The outer casing may have markings on it which register with the lever of the control knob 56 to index the variance of the gate limitation.

The cam could be modified and be made radio controlled so that the slow flow of water could be initiated from the fire site. By utilizing the cam itself as a valve, whether radio controlled or manually operated, operations are possible. For example, by throwing the cam wide open, a segment of hose can be filled rather quickly by a fireman at the fire hydrant.

In an alternative construction of the resilient member, a bumper of neoprene or other resilient material could be seated in the gate 34 and covered with a metallic leaf spring to minimize wear of the member caused by striking the cam. This construction has proven itself durable and free from the vibration-inducing qualities of some of the other types of springs tested.

Figure 2:
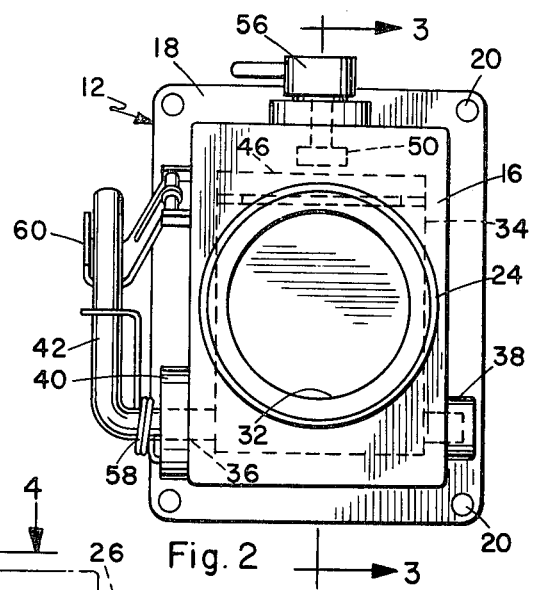
FIG. 2 is an enlarged end view of the unit, as taken from the right hand side of FIG. 1.

Turning to FIGS. 2 and 5 and returning to the reset lever 42 of the gate shaft, it can be seen that a spring 58 biases this lever so that the attached gate would ordinarily displace away from the valve outlet 32 and alongside the casing walls completely clear of the flow of water through the chamber. However to prevent this from happening a second spring loaded element in the form of a detent clip 60 is mounted on the casing side wall to hold the lever against the action of the spring so that the gate is close to the valve outlet but not in its final closed position.

Thus, due to the spring loading of the clip 60, when the gate is moved to its most closed position the detent will spring clear of the external lever 42 so that under the action of the spring 58 the gate will open absent a counterpressure caused by an adverse pressure differential.

The operation of the valve should be obvious from the above description of its parts. It must be borne in mind that the other end of the hose which connects to the hydrant connects to the fire truck and is shut off during the operation of the valve. Other hoses lead from the fire truck to the fire site proper and are nozzle-controlled by on-site firemen determining the draw on the main hydrant hose.

When a fire truck arrives at the hydrant near the fire site, the instant valve, which would be connected to the end of a hose, is attached to the fire hydrant as shown in FIG. 1 with the reset lever 42 being engaged by the detent 60. The fire hydrant is then turned on and the impact of the tremendous water pressure within the valve chamber 28 snaps the gate against the valve outlet to the extent permitted by the spring 46 as it strikes the cam 50. The hose 26, of course, is empty and flacid and provides no back pressure, so that the pressure differential is quite great and the force against the gate is commensurately high.

Figure 4:
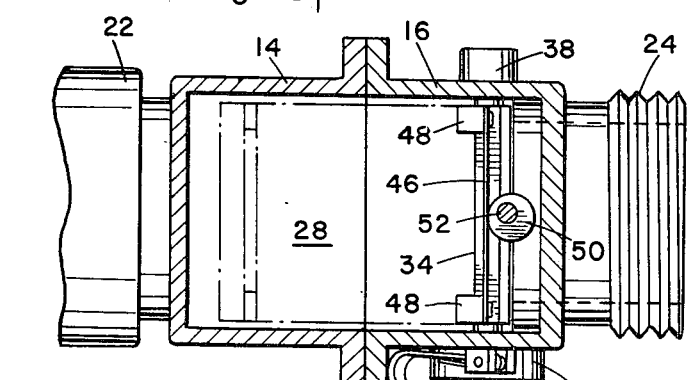
FIG. 4 is a sectional view taken on line 4—4 of FIG. 3, with the valve element in the near closed position.

As the gate is thus closed as far as it is permitted to travel, the detent 60 snaps back against the side wall of the casing in the position shown in FIG. 4. Now, because the gate is not entirely closed, water from the high pressure zone within the chamber flows into the outlet as is shown in FIG. 3 which over a period of several minutes will fill the hose completely.

When this occurs (that is, complete filling of the hose) the high pressure on both sides of the hinged gate 34 destroy the pressure differential and the gate will swing open into the position indicated in FIG. 6 under the action of the lever spring 58. The length of hose between the hydrant and the fire truck has thus been filled, the obstructions cleared, and pressure is now available at the truck.

To reuse the device, all that is necessary is of course to reset the lever 58 and engage it with the detent 60. Also the operation of the cam control knob 56 should be noted. By adjusting this knob, the time delay in the filling of the hose is affected in an obvious fashion. To accomodate different hose lengths, which are ordinarily provided in several standard lengths for fire-fighting, the actual hose length could be marked on the casing wall adjacent the control 56 to provide fairly standard timing of hose fill for different lengths. This knob could also obviously be used to make adjustments where for any reason the delay time would be advantageously greater or shorter than usual.

The leaf spring 46 represents a resilient element which could be other than a leaf spring, for example, an elastomeric substance. This element could obviously be omitted and the gate made to bear directly on the cam. By using a resilient bumper member here the gate will restrict flow roughly in proportion to the pressure differential across it so that variations in hose fill time caused by differences in hydrant pressure will be evened out to a great extent. These pressure differences can be substantial in different locations, even in the same town.

The effect of the cam and the partially closed clapper or gate of the present invention is clearly to provide a restricted, but not completely obstructed, passageway from the inlet to the outlet of the valve despite the substantial closure of the main gate 34. This could be accomplished by means of an alternative bleed passageway or duct rooted externally of the valve from the inlet to the outlet so that the gate would be permitted to close flush against the rim 44. This construction is intended to be within the scope of the invention. Such a duct or bleed passageway could also be provided with a stop cock or graduated valve to vary the timing of the initial hose fill, and pressure sensitive means could be incorporated to vary the aperature restriction based on pressure differential to duplicate the effect of the leaf spring bumper 46 in the illustrated embodiment.

It is the essence of the invention that a valve restriction be provided which operates solely on pressure differential across the valve, and by means which are sensitive to the abatement of the pressure differential, the valve is thrown open to provide complete nozzle pressure at the operational end of the hose.

A modified embodiment of the valve is shown in FIGS. 7 through 9. In this modification the essential operating mechanism of the valve as described above is still set forth in the half-chamber or half shell 16 defining the outlet half of the casing 12. In this instance through this half-chamber is coupled to a modified bi-valve chamber 62 having two gland nut coupled inlets 64 each of which is provided with a check valve 66 in the form of a pair of spring loaded flaps mounted inside the chamber.

This double inlet chamber is part of an existing coupling which of course does not use the flow retarding valve structure in the outlet as does applicant's. The dual inlet is used in the following circumstance. The firemen attach one of the inlets to a fire hydrant and begin drawing water from that hydrant. Because the second of the inlet valves will be checked closed the valve in this mode will operate as though there were only a single inlet and a single outlet.

If, however, it is subsequently found that the pressure in the hydrant is not high enough to adequately supply the number of hoses that are being fed from the secondary hoses connected to the fire truck, a supplemental water supply can be hosed in from another hydrant and introduced into the half chamber 62 through the second inlet. In this fashion the water supply to the valve outlet is continuous and uninterrupted while the additional pressure is coupled in. That same functioning of the double inlet coupling in retained in the structure shown in FIGS. 7 through 9 with the addition of applicant's flow retarding mechanism in the outlet half shell.

By connecting the half shell 62 to the flow retardant half shell 16 by means of the flanges 18, which could be bolted together as well as riveted, the chamber 16 can be used alternatively with the double inlet half casing 62 and the single inlet half 14 already described. Although ordinarily there would not be a lot of shuffling in a fire house to disconnect the two halves and couple them to accomplish a different function, a great deal of retooling at the point of manufacture can be saved by utilizing the same coupling structure in both of the embodiments.

Another feature of the invention which is shown only in the embodiment represented in FIGS. 7 through 9 for the sake of simplicity, but could equally well, and probably will be, used in the other version of the valve is the handle 68 best seen in FIG. 9. This handle projects from the side of the casing on which the reset lever 42 and its associated spring mechanisms are attached to protect this exterior structure from damage in handling. In its simplest form this handle is provided by extending the mating flanges of the half chambers 16 and 52 to include an opening 70 which is engageable easily by the hand.

A small detaining leaf spring or the equivalent 72 may be mounted in the handle to detain the reset lever in its open mode as shown in phantom in FIG. 8. The purpose of this spring is to prevent the lever from accidentally being moved while the valve is in use, thus causing the gate to close and shutting off a supply of water to the firefighters. This spring as well as the handle, as mentioned above, could and probably would be incorporated in both embodiments of the invention.

I claim:

1. A pressure differential flow retarding valve comprising:
   (a) a casing defining a water chamber having an inlet and an outlet;
   (b) gate means in said casing movable from a first position substantially seated against said outlet to a second position clear of said outlet and substantially clear of a fluid flow path defined between said inlet and outlet;
   (c) means biasing said gate means from said first position to said second position;
   (d) bypass means defining a restricted passageway communicating between said inlet and said outlet bypassing said gate means;
   (e) a detent which is releasable by the action of an inflow of fluid through said inlet for positioning said gate means in the fluid path between said inlet and outlet, whereby upon the inlet of said valve being connected to a source of high pressure and the outlet being connected to an initially evacuated hose, the pressure differential across said chamber will ensure that said gate means is in said first position and maintain same in said first position until fluid flow through said communication passageway fills said hose and abates said pressure differential, whereupon said gate means moves to said second position under action of said bias means to open said valve.

2. Structure according to claim 1 wherein said bypass means comprises a cam disposed within said enclosure and positioned such that at least a portion of said gate means strikes said cam to prevent same from completely closing against said outlet, whereby said restricted passageway is defined around said incompletely sealed gate means, and said cam is mounted on a shaft extending through said casing which is externally rotatively adjustable to vary the degree of restriction of said restricted passageway.

3. Structure according to claim 1 wherein said bypass means comprises a spacer positioned in said chamber to prevent complete closure of said gate means and including a leaf spring supported at both ends on said gate means and contacting said spacer substantially centrally on said spring when said gate means is in said first position, whereby varying pressure differential across said gate will vary the degree of closure thereof.

4. Structure according to claim 1 wherein said detent releasibly holds said gate means adjacent said first position against bias means.

5. Structure according to claim 4 wherein said gate means has a shaft journaled in said casing and said gate means rotates between said first and second positions on said shaft, and said shaft has one end extended through said casing with a manually operable reset lever articulated thereon.

6. Structure according to claim 5 wherein said releasible detent comprises a spring loaded clip movable from and biased from an engaged position in which said lever is held with said gate means adjacent said first position to a disengaged position releasing said lever, and movement of said gate into said first position effects the release of said clip to move to the disengaged position.

7. Structure according to claim 5 wherein said casing defines a carrying handle projecting from the side thereof adjacent said reset lever to serve the additional function of shielding said lever from handling damage.

8. Structure according to claim 5 and including a temporary restraining member mounted to said casing for restraining said reset lever in the open position to prevent the accidental closure of said gate means during use.

9. Structure according to claim 8 wherein said casing has a handle thereon mounted adjacent said reset lever to protect same, said handle defining an opening and mounting said restraining means to project into said opening, and said reset lever being positioned to swing into said opening when said gate means moves into said second position.

* * * * *